United States Patent [19]

Brasure et al.

[11] Patent Number: 5,006,593
[45] Date of Patent: Apr. 9, 1991

[54] CATENATED POLYMER SYSTEMS

[75] Inventors: Donald E. Brasure, Tonawanda, N.Y.; Eugene G. Sommerfeld, Mt. Laurel, N.J.

[73] Assignee: E. I. Du Pont de Nemours and Company, Wilmington, Del.

[21] Appl. No.: 207,534

[22] Filed: Jun. 16, 1988

[51] Int. Cl.$^5$ .......................... C08K 5/20; C08L 27/12
[52] U.S. Cl. ..................................... 524/520; 523/427; 524/503; 524/517; 524/506; 524/507; 524/513; 524/514; 525/276
[58] Field of Search ............... 524/233, 502, 503, 506, 524/507, 513, 514, 515, 519, 520, 533, 529, 535, 536; 523/427, 437

[56] References Cited

U.S. PATENT DOCUMENTS

| | | | |
|---|---|---|---|
| 3,542,661 | 11/1970 | Klopfer | 525/305 |
| 4,128,600 | 12/1978 | Skinner | 525/303 |
| 4,468,499 | 8/1984 | Siegfried et al. | 525/301 |
| 4,521,567 | 6/1985 | Arndt | 525/305 |
| 4,605,465 | 8/1986 | Morgan | 525/305 |
| 4,758,627 | 7/1988 | Wilkus | 525/199 |

OTHER PUBLICATIONS

Tysall, L. A., Industrial Paints, Macmillan (N.Y.), 1964, pp. 48–51.
Skeist, I., Handbook of Adhesives, Reinhold (N.Y.) 1962, pp. 436, 437.
Legge, N. R.; Holden, G.; and Shroeder, H. E., Thermoplastic Elastomers, Hanser Publishers, Munich 1987.

Primary Examiner—Christopher Henderson
Attorney, Agent, or Firm—Donald W. Huntley

[57] ABSTRACT

Dispersions of polymer systems comprising two normally incompatible polymer networks, one of which is held together by physical interactions and the other by chemical cross-links, the networks being catenated, are useful for making coating compositions, films and molded articles.

4 Claims, No Drawings

CATENATED POLYMER SYSTEMS

TECHNICAL FIELD

This invention relates to dispersions of polymer systems. It is more particularly directed to dispersions of systems of two or more normally incompatible polymer chains, which systems comprise (a) networks of polymer chains, segments of which are held together by physical interactions, and (b) networks of chains of one or more chemically cross-linked polymers, the (a) networks and (b) networks being catenated.

It is also directed to a method for preparing the dispersions, to coating compositions made with the dispersions, and to coated substrates, films and molded articles made from the polymer material remaining after the liquid carriers have been removed from such dispersions.

BACKGROUND OF THE INVENTION

Poly(vinyl fluoride) (PVF) is a commercially useful polymer, widely used because of its durability and its resistance to degradation on exposure to weather. It is, however, quite stiff, and better conformability (i.e., lower modulus) would be desirable. Attempts to obtain this on a commercial scale by copolymerizing PVF with other monomers, or by blending PVF with other polymers, have been, for the most part, unsuccessful.

It has now been found that the catenated networks of PVF and other polymers in the dispersions of the invention give a more satisfactory modulus without sacrificing other desirable properties, and, in addition, give improved clarity in ultraviolet stabilized films and enhanced mar resistance.

DETAILED DESCRIPTION OF THE INVENTION

A dispersion of the invention is composed of a dispersed phase in an organic liquid carrier. The dispersed phase, in turn, is composed of a system of two or more normally incompatible polymers. This system comprises (a) networks of polymer chains, segments of which are held together by physical interactions, and (b) networks of chains of one or more chemically cross-linked polymers, the (a) and (b) networks being catenated.

By "network" is meant a three-dimensional system of polymer chains which are held together by either (a) chemical crosslinks, or by (b) physical interactions between segments of the polymer chains, such as hydrogen bonding, dipole-dipole interactions or crystal lattice forces.

"Catenated" means the connection of the networks by the interlocking of some portions of those networks so that physical separation, as determined by high pressure liquid chromatography (HPLC), is not possible without breaking or otherwise disrupting the interlocks. No actual chemical bonds need exist between the atoms of one network and those of the other.

"Incompatible" is used here to describe the inability of two or more polymers to remain in intimate contact on a microscopic scale.

The dispersions of the invention are in organic liquid carriers. Any organic liquid can be used which is compatible with the system, i.e., one which does not adversely affect the physical or chemical characteristics of the constituent polymer chains or their networks to any significant degree.

Illustrative of the liquids which can be used are the aromatic and aliphatic hydrocarbons, ketones, alcohols, ethers, alcohol esters, esters, chlorinated hydrocarbons, ethylen and propylene carbonate, and aprotic solvents such as N-methylpyrrolidone, N,N-diemthyacetamide and dimethylsulfoxide. Mixtures of liquids can also be used.

The polymers in the dispersions of the invention are present in two types. In the first type, (a), the polymers are in the form of networks segments of which are held together by physical interactions. Preferred are polymers having 20–80% crystallinity, as measured by conventional X-ray diffraction techniques. Illustrative of such polymers, in addition to PVF, are poly(vinylidene fluoride) (PVDF), poly(tetrafluoroethylene) (PTFE), tetrafluoroethylene/hexafluoropropylene copolymers, tetrafluoroethylene/perfluoropropylvinyl ether copolymers, poly(chlorotrifluoroethylene), tetrafluoroethylene/ethylene copolymers, poly(vinyl chloride)(PVC), poly(vinylidene chloride)(PVDC), polyamides, polyesters, polyolefins, and polyacetals.

In the second type, (b), the polymers are in the form of networks of chemically cross-linked chains. Illustrative of these are acrylate polymers, methacrylate polymers, epoxies, urethane polymers, polyesters, vinyl halide polymers, vinylidine halide polymers, vinyl ester polymers, vinyl alcohol polymers, polyamides, polyimides, silicone polymers, polycarbonates, polyethers, polyolefins, poly(arylene sulfides) and poly(arylene sulfones). The polymer chains can be homopolymers or copolymers, and are cross-linked with conventional cross-linking agents such as, for example, ethylene glycol dimethacrylate or a triisocyanate. Preferred are the acrylates, methacrylates, epoxies, urethane polymers and polyesters.

A catenated system can be made from any of the foregoing (a) types matched with any (b) types, provided that the following conditions are met:

(1) Monomers or solutions of monomers used to make the (b) type polymers must be able to swell and/or permeate the network of the (a) type polymer without destroying it under the conditions used to prepare the dispersions;

(2) The preparative polymerizations of the type (b) polymers must be capable of occurring in the presence of the type (a) polymers under conditions which swell and/or permeate but do not destroy the (a) network; and (b) The respective constituent polymers of the catenated systems must be incompatible with one another in the absence of catenation.

Illustrative of the systems which can be used to make the dispersions of the invention are
PVF—MMA/BHPEA/EDMA
PVF—2-EHMA/BHPEA/EDMA
PVF—2-EHA/BHPEA/EDMA
PVF—BA/BHPEA/EDMA
PVF—MMA/DMAEM/EDMA
PVF—OMA/BHPEA/EDMA
PVF—BHPEA/DMAEM/EDMA
PVF—MMA/EDMA
PVF—EHMA/GMA/EDMA
PVF—BHPEA/HEMA/EDMA
PVF—PGMM/BHPEA/EDMA
PVF—BHPEA/EDMA
PVF—DMAEM/EDMA PVF—HEMA/EDMA
PVF—2-EHMA/HEMA/EDMA
PVF—2-EHA/EDMA
PVF—BMA/BHPEA/EDMA
PVF—BHPEA/LA/EDMA In the foregoing list, the symbols have the following meanings:
MMA = methyl methacrylate
BA = butyl acrylate
HEMA = hydroxyethyl methacrylate
EDMA = ethylene dimethacrylate
DMAEM = diethylaminoethyl methacrylate
BHPEA = 2-(4-benzoyl-4-hydroxyphenoxy)ethyl acrylate
2-EHMA = 2-ethylhexyl methacrylate
2-EHA = 2-ethylhexyl acrylate
BMA = butyl methacrylate
OMA = octyl methacrylate
GMA = glycidyl methacrylate
PGMM = polyethylene glycol monomethacrylate
LA = lauryl methacrylate The dispersions of the invention can be prepared by polymerizing one set of monomers, to form the (b) polymer, into an already formed polymer network (a), a sequential operation.

Polymer network (a) is prepared conventionally and recovered as a fine powder. Monomers for polymer (b) and a suitable crosslinking agent are then added to a suitable organic liquid, and to this liquid is then added the polymer (a) powder. Polymer (a) and monomers (b) are present in the liquid in (a)/(b) weight ratios of 1/20 to 20/1.

The liquid is then heated to a temperature at which the amorphous regions of polymer network (a) will be permeated with monomers or with monomers plus an organic liquid, but not to a temperature which destroys the network. The liquid is then held long enough to allow significant permeation of the (b) monomers and suitable crosslinking agent into the amorphous regions of polymer network (a). Initiator or catalyst for the (b) monomer polymerization is then added, and the liquid is held at a temperature suitable for polymerization until polymer (b) has a molecular weight $M_w$ of 30,000 or more, as determined by GPC.

Times, temperatures, initiators/catalysts and pressures are conventional for the monomers chosen, and the polymerization is carried out so that the resulting dispersion contains about 20–60% solids (total polymers).

The resulting dispersion can be used directly, or can be blended with additional polymer (a) or (b) to give (a)/(b) weight ratios of from 3/97 to 97/3, preferably 60/40 to 97/3.

The dispersions of the invention can be used, with or without pigments, to make coatings for industrial, automotive and aeronautic purposes. They are especially useful for applying mar-resistant finishes to automobile and truck parts.

The residues from removal of the organic liquid carriers from the dispersions can be used to make films useful as semipermeable membranes for the purification of water and for use in electrolytic cells, as mar-resistant films for structural automobile parts and building panels, and as mold release films for printed circuit boards and for the formation of curved panels of various plastic materials in aircraft and automobile production. The residues can also be extruded or molded into various useful shapes such as siding panels.

Superior toughness-flexibility balance and solvent resistance can be built into the residues by further cross-linking one or more of the constituent polymers with such external cross-linking agents as epoxies, isocyanates and aminoplast resins.

The invention will be more easily understood by referring to the following illustrative examples. In these examples, all parts are by weight unless indicated otherwise.

EXAMPLE 1

(a) An initiator solution was prepared by dissolving 0.48 parts of 2,2-azobis(2,4-dimethylpentane nitrile) in 13.33 parts of dimethylacetamide.

(b) To a reaction vessel were charged

| | |
|---|---|
| Dimethylacetamide | 72.00 parts |
| PVF powder | 24.00 |
| MMA | 17.82 |
| BHPEA | 5.94 |
| EDMA | 0.24 |

This dispersion was heated to 87° C., held there for one minute, and then cooled to 70° C. It was then held at 70° C. for two hours, with stirring, under nitrogen. One-half of solution (a) was then added, the dispersion held at 70°–80° C. for two hours, and the remainder of solution (a) added. The dispersion was then held at 70°–80° C. for an additional two hours and cooled to room temperature.

The resulting milky dispersion, 36% solids, contained a PVF—MMA/BHPEA/EDMA catenated system.

Dispersions of the following systems can be made in substantially the same way by making appropriate component substitutions:
PVF—BHPEA/EDMA
PVF—BHPEA/DMAEM/EDMA
PVF—BHPEA/HEMA/EDMA
PVF—DMAEM/EDMA
PVF—HEMA/EDMA
PVF—2-EHMA/BHPEA/EDMA
PVF—2-EHMA/HEMA/EDMA
PVF—2-EHA/EDMA
PVF—BMA/BHPEA/EDMA
PVF—BHPEA/LA/EDMA
PVF—BA/BHPEA/EDMA
PVF—OMA/BHPEA/EDMA
PVF—2-EHMA/GMA/EDMA
PVF—PGMM/BHPEA/EDMA

EXAMPLE 2

To a container the following were added:

| | |
|---|---|
| Dispersion of Example 1 | 44.440 parts |
| Epon 1004 - epichlorohydrin/ bisphenol A adduct (Shell Chemical Co.) | 0.400 |
| Triphenyl phosphite | 0.008 |
| PVF | 31.550 |
| Dimethylacetamide | 31.550 |
| Total | 107.948 |

This mixture was cast on a ferrotype plate, covered with a second plate and placed in a press at 150° C. and a pressure of 100 psi for five minutes. The resulting film was then removed from the press, cooled, clamped in a frame and placed in an air oven at 150° C. for 10 minutes.

The resulting transparent film had a thickness of 2.0 mil.

We claim:

1. A dispersion consisting essentially of a continuous phase of a compatible organic liquid carrier and a dispersed phase of a system of two or more normally incompatible polymers, the system comprising
    (a) networks of polymer chains, segments of which are held together by physical interactions, and
    (b) networks of chains of one or more chemically cross-linked polymers,
the networks of (a) and (b) being catenated.

2. The dispersion of claim 1 in which the polymer chains in (a) have 20–80% crystallinity.

3. The dispersion of claim 1 in which (a) is PVF, PVDF, PTFE, a TFE/HFP copolymer, a TFE/perfluoropropyl vinyl ether copolymer, poly(chlorotrifluoroethylene), a TFE/ethylene copolymer, PVC, PVDC, a polyamide, a polyester, a polyolefin or a polyacetal, and (b) is an acrylate, a methacrylate, an epoxy, a urethane polymer, a polyester, a vinyl halide polymer, a vinylidene halide polymer, a vinyl ester polymer, a vinyl alcohol polymer, a polyamide, a polyimide, a silicone polymer, a polycarbonate, a polyether, a polyolefin, a polyarylene sulfide or a polyarylene sulfone.

4. The dispersion of claim 3 in which polymer (a) is PVF and polymer (b) is an acrylate or methacrylate.

* * * * *